June 22, 1965     H. C. H. VAN RIJSEWIJK     3,190,523
COMPONENT INSERTING MACHINE Filed Aug. 24, 1961     8 Sheets-Sheet 1

INVENTOR
HENRI C. HAVERKORN VAN RIJSEWIJK

BY
AGENT

INVENTOR
HENRI C. HAVERKORN VAN RIJSEWIJK
AGENT

June 22, 1965 H. C. H. VAN RIJSEWIJK 3,190,523
COMPONENT INSERTING MACHINE
Filed Aug. 24, 1961 8 Sheets-Sheet 8

INVENTOR
HENRI C. HAVERKORN VAN RIJSEWIJK
BY
AGENT

United States Patent Office 3,190,523
Patented June 22, 1965

3,190,523
COMPONENT INSERTING MACHINE
Henri Carel Haverkorn van Rijsewijk, Eindhoven, Netherlands, assignor to North American Philips Company, Inc., New York, N.Y., a corporation of Delaware
Filed Aug. 24, 1961, Ser. No. 134,034
Claims priority, application Netherlands, Sept. 17, 1960, 256,302
15 Claims. (Cl. 227—93)

This invention relates a machine for mechanically inserting small electric component parts, such as capacitors, resistors and the like, provided on one side with one or more substantially parallel projections, such as connecting pins or wires, into apertured mounting plates or printed circuit boards.

In mechanically inserting such component parts the body of which is usually lacquered, difficulties are involved since the positions of the projections or wire leads relative to the lacquered body are not determined within narrow limits. More particularly if the wires have a small diameter, for example 0.8 mm., and the apertures are only 1.1 mm. in diameter, as is the case with small component parts and correspondingly small mounting plates, the wires must be brought exactly over the apertures to permit mechanical insertion. According to the invention the component parts led into a machine are gripped without deformation between the body of a component part and the extremities of the projections, whereupon the gripping means are moved so that the projections are introduced into the apertures likewise without deformation. Thus, according to the invention, it is ensured that the insecurity in the location of the projections relative to the periphery of the component is of no concern and the projections are placed exactly centrically relative to the apertures and may be inserted through them.

In one feature of the invention, the gripping means also aid in cutting the projections to size. A particular cutting device for the projections, which are usually too long, is thus not required.

In another feature of the invention, the gripping means is formed by a pair of tongs having two jaws, at least one of which is provided with recesses to receive the projections upon gripping, while the body of the component lies free between the jaws. Although it is possible to grip each projection separately, for example by means of a pair of tongs in the form of tweezers, and to move this assembly of tongs simultaneously and above the mounting plate, the present embodiment affords the advantage that only one pair of tongs is required in which the projections are held in position, while there is no risk of the body of the component part being damaged.

The component parts may be introduced into the machine in any suitable manner. However, in one embodiment of the invention, in order to obtain a regular operation and minimize complex movements of the tongs, it is preferable that the component parts, together with their projections are fed to the machine in parallel with one another and that the mounting plate (circuit board) is positioned in parallel with the projections, the tongs, which then have a position parallel to the projections, gripping the projections and subsequently being turned through an angle such as to be at right angles to the mounting plate.

In a further feature of the invention, a simple machine construction is obtained if the mounting plate is introduced into the machine in the horizontal position and both the tongs and the projections are also positioned horizontally at the moment of gripping. In order to simplify the movement of the tongs as much as possible, the component parts are supplied discontinuously (indexing movement) and moved between the open jaws of the tongs by the feed device. Thus, the tongs in themselves need not perform a movement solely for gripping.

In accordance with the invention, the tongs are preferably mounted in a swingable housing, one jaw being rigidly connected to the tongs and the other jaw being pivoted relative to the tongs and the housing. The jaw rigidly connected to the tongs, in co-action with a stationary cutting blade, cuts the projections to size due to the swinging movement of the housing, while at the same time, as a result of this movement, the movable jaw is urged against the fixed jaw. Thus, the beginning of the swinging movement of the tongs, which brings the component part to its correct position above the mounting plate, cause the component part to be gripped and the projections cut off with one movement.

After the closed tongs are placed at right angles to the mounting plate due to swinging of the tong housing and the tongs, a pressing rod, located in an axial direction in the tongs is pressed downwards, whereby at first the projections slide between the closed jams and are partly introduced into the board apertures and then the tongs, due to the tong housing slightly turning in the opposite direction, are fully opened and at the same time, due to a continued movement of the pressing rod, the projections are pushed fully into the apertures of the mounting plate. The projections are thus guided as long as possible and only when complete security is obtained are the projections released and the component part brought to its ultimate position.

In order that the invention may be readily carried into effect, it will now be described in detail, with reference to the accompanying drawing, showing a presently preferred example of a machine according thereto having additional features and advantages in addition to those noted above and in which FIGURES 1, 2, and 3 show several component parts to be inserted into an apertured mounting plate with printed circuits.

Figure 1:
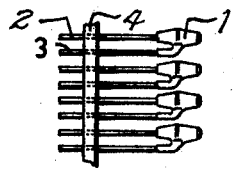
Figure 2:
Figure 3:
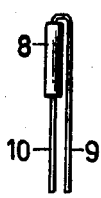

FIGURE 1 shows a body 1 of a small electric capacitor provided with projections 2 and 3, which are arranged in known manner on a supple tape 4. FIGURE 2 shows an electrical resistor 5 provided with two projections 6 and 7. A similar resistor 8 having two projections 9 and 10 is shown in FIGURE 3. The bodies 1, 5 and 8 have usually been dipped in lacquer with the result that the location of the projections relative to the bodies is not determined with a small tolerance. In mechanically inserting such component parts, difficulties are thus involved upon gripping the bodies of such parts, which difficulties are obviated when using the machine which will now be described.

In FIGURES 4, 5, 6, 7 and 9, two side plates 11 and 12 are connected at their upper sides by means of a covering plate 13. At their front there is provided a bevelled connecting plate 14 which is provided with a table 15 having a groove 16. Arranged between the plates 11 and 12 is a housing 17 having pins 18 one on each side (FIG. 8), which are rotatably journalled in the plates 11 and 12. The lower side of the housing 17 has a slot 19. Arranged to be slidable in the housing 17 is the cylindrical tong body 21 terminating in a fixed jaw 22. Two grooves 23 in fixed jaw 22 are provided in the direction of length of the jaw 22. Arranged in the tong body 21 is a second jaw 24 which is pivotally mounted on a pin 25, fixedly secured in the body 21, and which is loaded at its other extremity by a spring 26 rigidly connected to the body 21. Slidable in this body is a pressing rod 27, one extremity of which is journalled in a bearing 28, rigidly connected to the movable jaw 24, and the bearing 28 has rounded supporting surfaces, and the other extremity of which is journalled in a bearing 29 provided in the tong body 21. One end of the pressing rod 27 has a knob 30 and its other end has a thickened portion 31 located in the journal 29. A compression spring 32 is provided between the thickened portion 31 and the tong body 21. Between the extremity of the housing 17 and a collar portion 33 of the tong body 21 there are provided two compression springs 34 (FIG. 9) which act on a collar 33 of the tong body and against the housing 17. Secured to the collar portion 33 is a plate 35 provided with a pin 36 to which a lever 37 is pivoted, the movement of the lever 37 being limited by an abutment 38 on plate 35. The collar 33 is provided with two pins 39 which co-act with stops 40 provided on each side of the plates 11 and 12, the pins 39 on the body 21 coacting with the stationary cam 40 to initiate sliding movement of the tong body 21 within the housing 17 thus aligning the push rod 44 and collar lever 20a in order that the tong body 21 will be fully extended toward the circuit board by virtue of the piston 42 and connecting rod 43. Compare the position of tong body 21 relative to housing 17 in FIGS. 5 and 6.

Arranged on the upper plate 13 is a double-action air cylinder 41 and a piston 42 connected by means of a piston rod 43 to a rod 44 which in turn is pivotally secured to a lever 20a which is rigidly secured to the collar 20. The connection securing the collar 20 with the tong body 21 via the tong 22 is made in any suitable known manner, by pinning, bolting, or forming the parts integral (not shown). The air cylinder 41 is connected through two ducts 87 and 88 to an electrically controlled valve 91 which is coupled to a line for compressed air. A lever 46, which is pivoted to a pin 45 provided in the side plate 11, has a pin 47 at one end and an adjustable pressing pin 48 at its other end, the lower end of the lever 46 being connected by means of a pull spring 49 to a fixed point on the plate 11. The lever 46 is also provided with a pressing roller 50.

Figure 9:
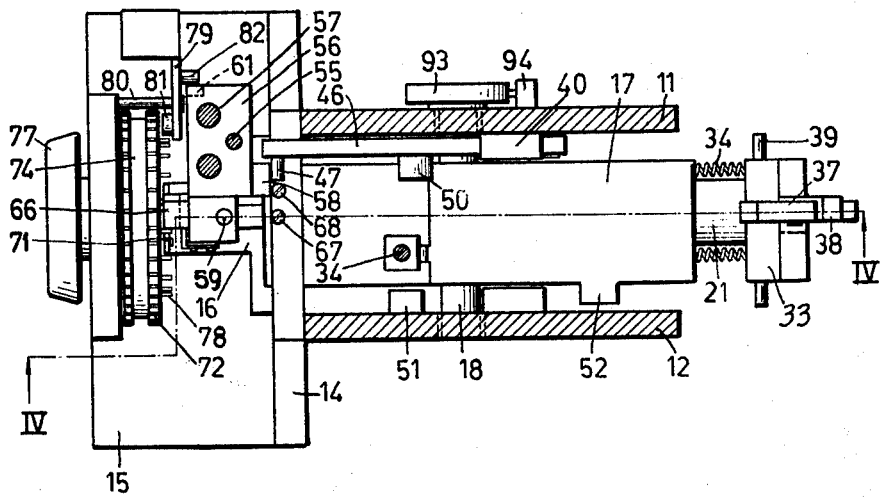
FIGURE 9 is a sectional view of the machine shown in FIGURE 4, taken along the line III—III and viewed in the direction indicated by the arrow.
Figure 10:
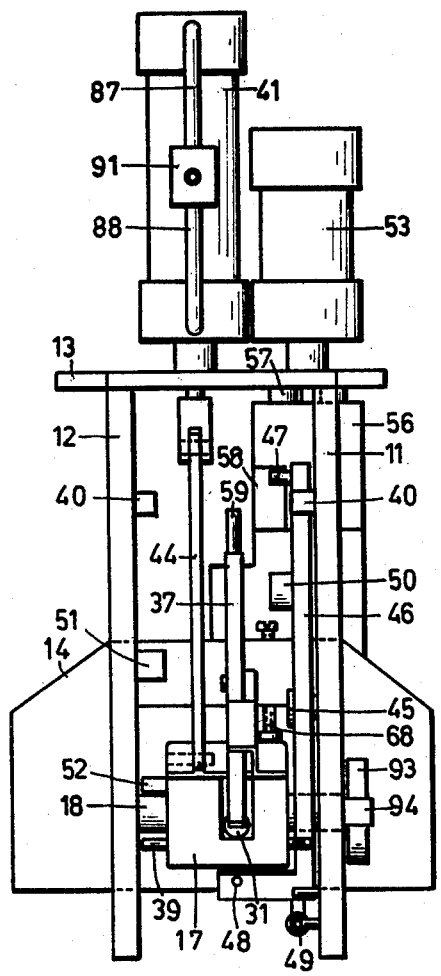
FIGURE 10 is a rear view of the machine shown in FIGURE 4.

The frame plate 12 carries an abutment 51 and the housing 17 also has an abutment 52 which co-acts therewith (FIGURE 9).

Provided on the covering plate 13 is a second double-action air cylinder 53 in which a piston 54 and a piston rod 55 are adapted to move. The cylinder 53 is connected via two ducts 89 and 90 to an electrically controlled valve 92, which in turn is coupled to a line for compressed air. Secured to the piston rod 55 is a control block 56 which is slideably mounted on two guide rods 57. The control block 56 has an abutment 58 which co-acts with the pin 47; it also carries an exchangeable pressing pin 59 and a second pressing pin 60 and it also has a groove 61. Pivotally arranged on the control block is a ratchet 62 (FIGS. 11 and 12) which can turn about a pin 63 and is urged against a stop 65 by means of a spring 64. From FIGURE 4, it can also be seen that the ratchet 62 has a thickened upper end 66 bounded by two inclined surfaces 102 and 105.

Arranged on the plate 14 are two adjustable stops 67 and 68, the stop 67 co-acting with a pressing pin 69 slidably arranged in the collar 20 and extending through an aperture in the tong body 21. A collar 70 on pin 69 rests on the bearing 28.

Figure 4:
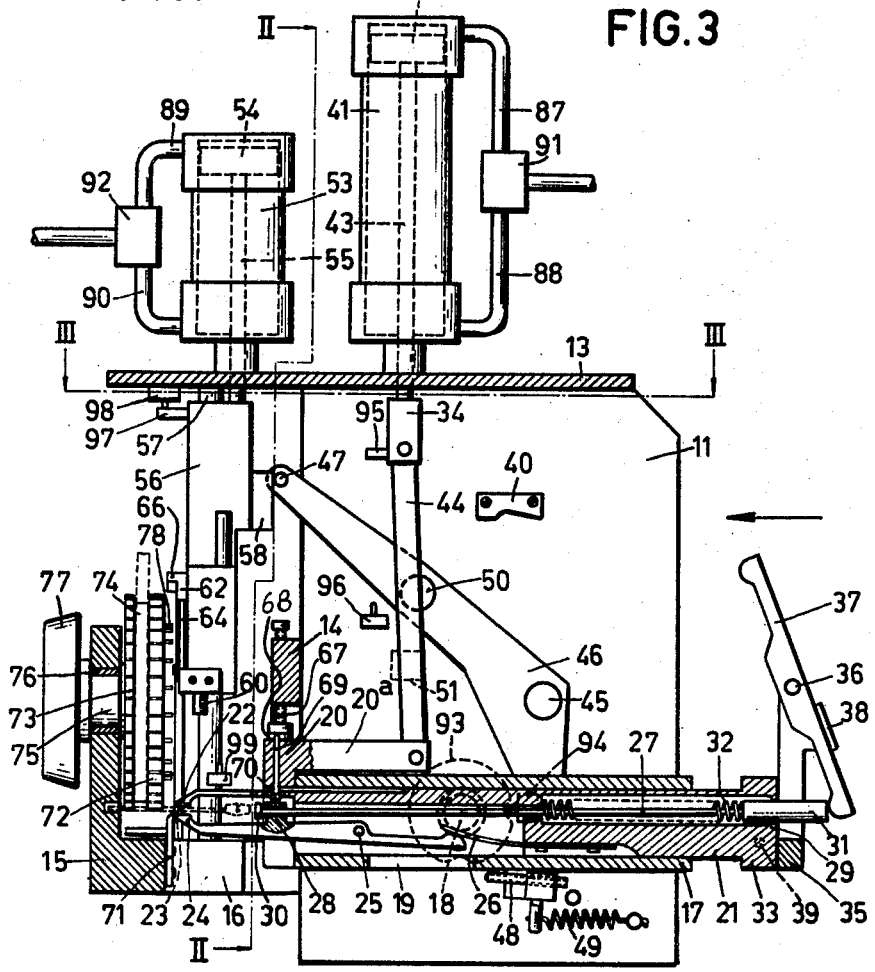
FIGURES 4, 5, 6 and 7 are sectional views of an inserting machine taken along the line IV—IV of FIGURE 9, the inserting mechanism proper being shown in four different positions.
Figure 5:
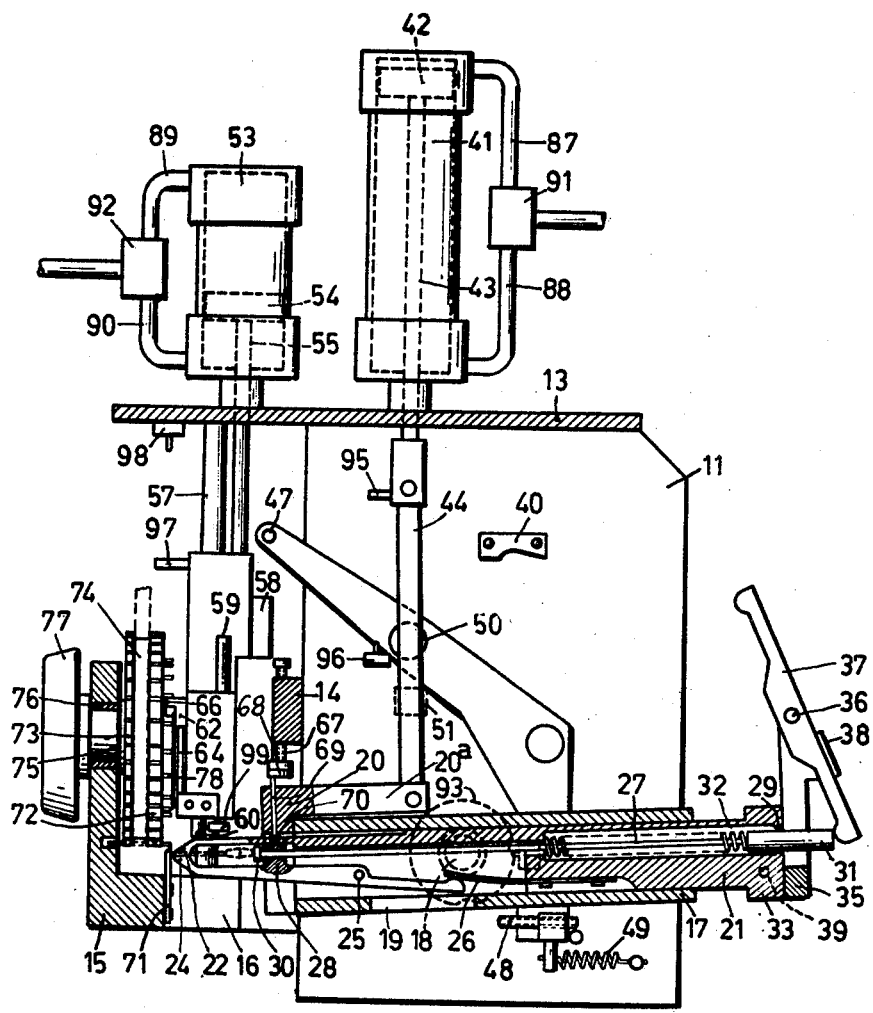

Table 15 carries a cutting blade 71 adjacent the ends of jaws 22 and 24 in the position of FIGS. 4 and 5.

Figure 11:
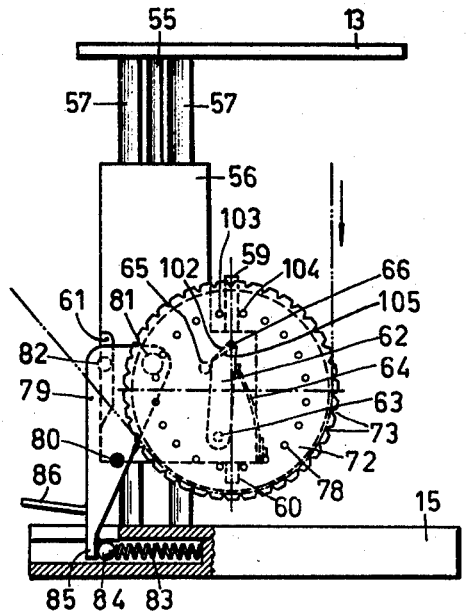
FIGURES 11 and 12 show the feed mechanism of the machine of FIGURE 4 in two different positions.
Figure 12:
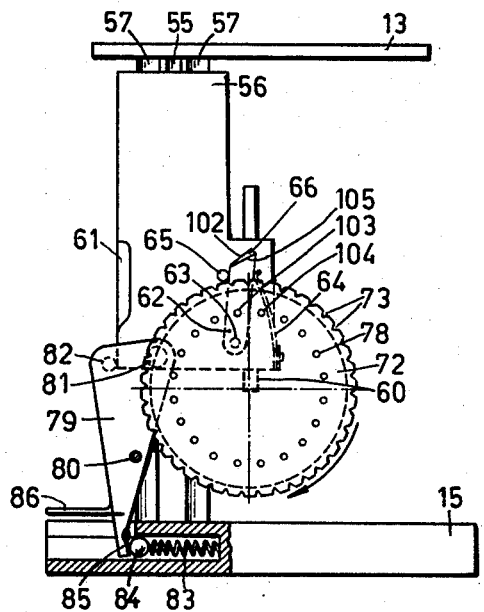

The feed device for the tape carrying component parts as shown in FIGURE 1 will now be described with reference to FIGURE 4 in combination with FIGURES 11 and 12. This device comprises a disc 72 provided with peripheral grooves 73 and a central depression 74. The disc has a shaft 75 and is journalled in a bearing 76 carried by an upwardly extending portion of table 15, the shaft 75 being provided with a knob 77. The side of the disc adjacent the machine has pins 78 which are uniformly spaced over a circle. The distance between the control block 56 and the ends of the pins 78 is such that the body of the ratchet 62 can turn between these ends and the control block 56. However, the thickened portion 66 of the ratchet 62 overlies the ends of pins 78 as shown in FIGURE 4. There is also provided a lever 79 which is pivoted about fixed pin 80 on frame 15 and which carries a pin 81 (which may be rotatable) which engages two pins 78, but pin 81 cannot pass between them. The lever 79 also has a control pin 82 located in the groove 61 of the control block 56. A compression spring 83 and a ball 84 (FIGS. 11 and 12) in table 15 engage an extremity 85 of the lever 79, a handle 86 being provided which permits of turning the lever 79 by hand.

The pins 18, about which the housing 17 is tiltable, carry a cam disc 93 which co-acts with a fixedly arranged switch 94. The cam disc 93 and the switch 94 are arranged on the outer side of the frame plate 11. The piston rod 43 carries an abutment 95 which co-acts with a switch 96, while the control block 56 has a stop 97 which operates a switch 98.

Figure 6:
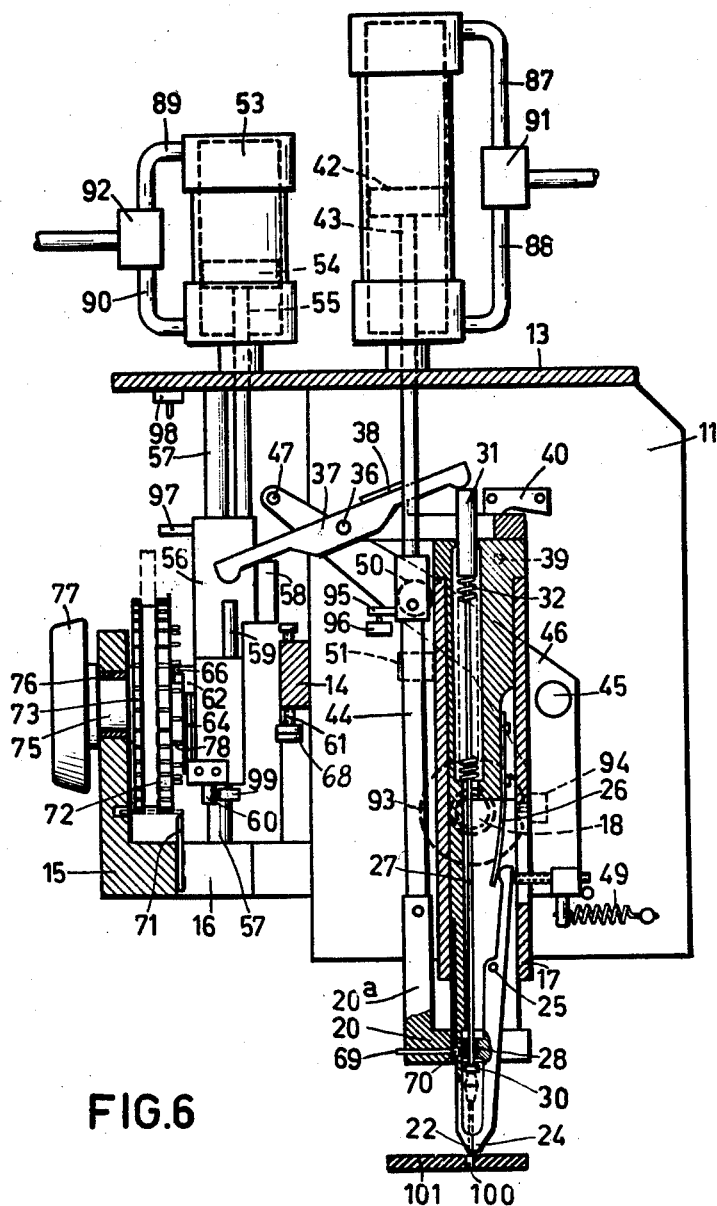
Figure 7:
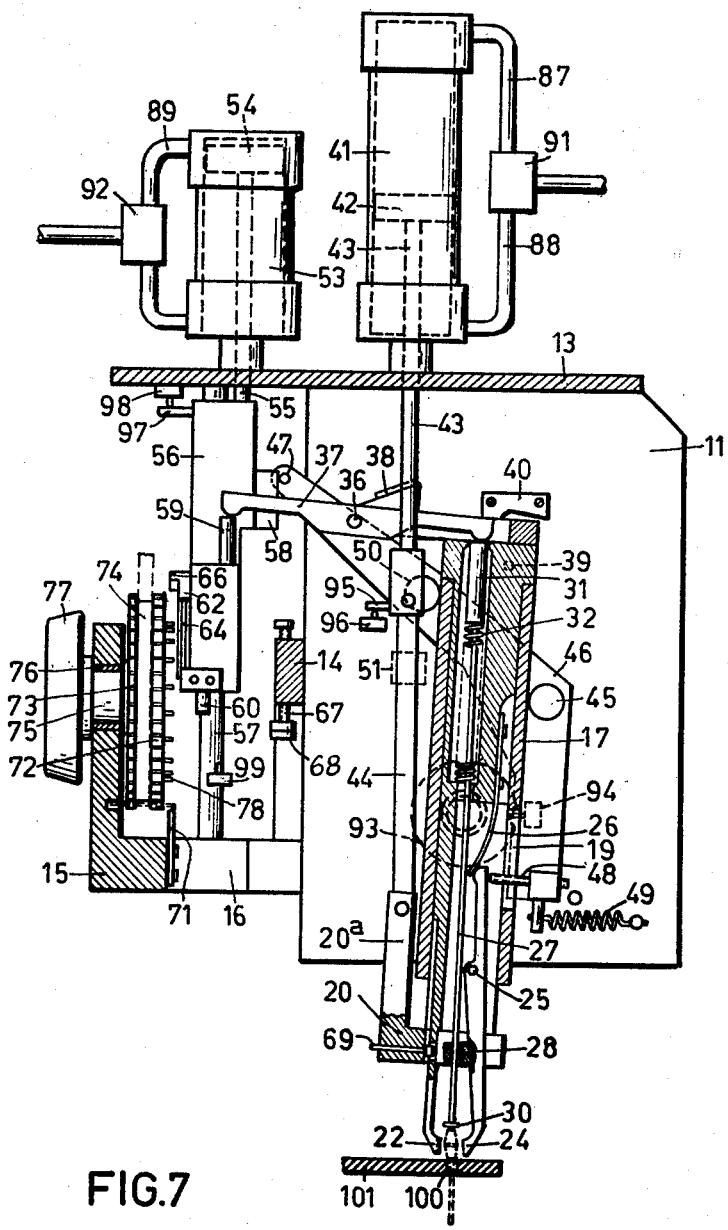
Figure 8:
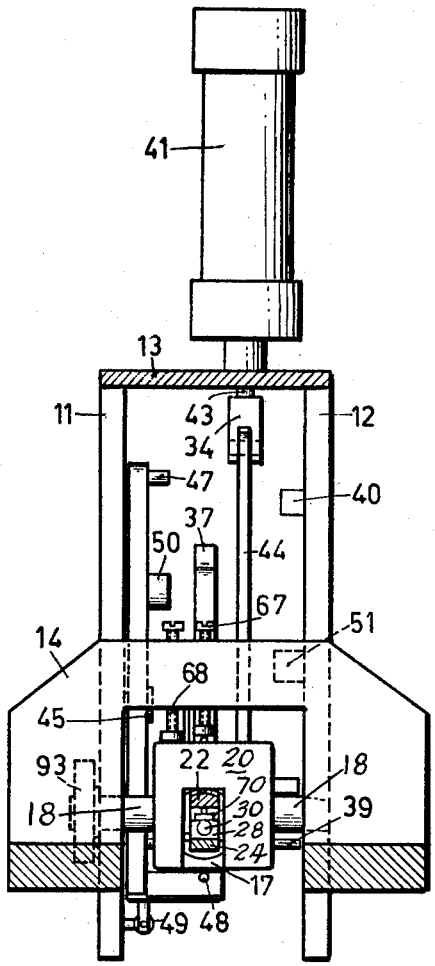
FIGURE 8 is a sectional view of the machine shown in FIGURE 4, taken along the line II—II and viewed in the direction indicated by the arrow.

The operation of the machine will now be described with reference to the figures, it being assumed that the tape 4, in which the projections 2 and 3 of a component part 1 are located lies in the groove 74, and one component part is between the open jaws 22 and 24 due to the initial downward movement of the control block 56. The jaws are open, due to the fixed jaw engaging the abutment 68, and the pin 69, which pushes against the bearing 28, fixedly connected to the pivotal jaw 24, is displaced by the stop 67, so that this movable jaw has been turned about the pivot 25 against the action of the spring 26. The control block 56, which has operated the switch 98 in its upper position, continues to move downward due to air being admitted above the piston 54, i.e. electric valve 92 is electrically connected with switch 98 in a suitable electric circuit and thus air is admitted through duct 89 to cylinder 53. This downward movement pushes the pin 60 against the fixed jaw 22 and, due to the continued movement of the control block, the fixed jaw 22 and the tong body 21 are slightly turned downwards until the projections 2 and 3 lie in the grooves 23 of the fixed jaw 22. This movement is possible because the housing 17 can swing about its pins 18 in the plates 11 and 12. However, due to this swinging movement, the pin 69 disengages from the stop 67 and now the spring 26 pushes the movable jaw 24 upwards until it engages the projections at the under-side. The projections are now located between the closed jaws. Due to the continued movement of the control block 56, the close tong jaws push the projections against the cutting blades 71, the projections thus being cut to size. Now, the position shown in FIGURE 5 is reached and the control block pushes against a switch 99. The electrically controlled valve 91 is then energized (through suitable electric circuits) so that air is admitted above the piston 42. This piston thus moves downwards and by means of the driving rod 44 and the lever 20a, the housing 17 and the tong body 21 turn further about the pins 18. When the piston 42 has covered a portion of its path, the housing 17 and the tong body 21 are positioned vertically, but the piston 42 moves on and now pushes the tong body 21 downwards against the action of the springs 34 (FIG. 9) until the collar 33 engages the housing 17 as shown in FIGURE 6. This downward movement of the tong body 21 relative to housing 17 is initiated by the pins 39, provided on collar 33 of tong body 21, engaging the cams 40 as the body 21 and housing 17 approach their vertical position and the relative position of the body 21 and housing 17 is still as shown in FIGS. 4 and 5, i.e. extended rather than engaged at collar 33 as seen in FIGURES 6 and 7. Air is now admitted under the piston 54 by means of the electrically controlled valve 92 which is energized through the switch 94 which is operated by the cam disc 93. The piston 54 now moves upwards. In the first place the pin 59 on control block 56 now engages the extremity of the lever 37, which turns about the pin 36 and pushes the pressing rod 27 downwards. The head 30 of the pressing rod 27 then pushes against the body of the component part 1. The projections 2 and 3 can slide between the closed jaws and enter apertures 100 of a mounting plate 101. Due to the continued movement of the control block 56, the pin 47 of lines 46 engages the abutment 58, thus the lever 46 is turned about the pin 45 and the pin 48 at the other end lever 46 pushes through the slot 19 against the upper end of the movable jaw 24 (FIG. 7). The movable jaw then turns about the pivot 25, but at the same time the roller 50 engages the housing 17, which is thus slightly turned back about the pins 18 and disengages from the abutment 51. The control block 56 is still moving upwards so that the knob 30 of the pressing rod 27 pushes the component part further downwards until it engages the mounting plate and the projections 2 and 3 lie wholly in the apertures 100. At this moment, the abutment 97 pushes against the switch 98 and now compressed air is admitted under the piston 42 through the valve 91 and the duct 88. The piston 42 moves upwards and the lever 37 follows this movement until the position shown in FIGURE 4 is reached again. However, no component part lies between the open jaws as yet. The spring 49 connected to one end of lever 46 ensures that the pin 47 always bears against or on the abutment 58 and the spring 32 moves the pressing rod 27 and hence the lever 37 back against the stop 38.

During the upward movement of the control block, the ratchet 62 (see FIGURES 11 and 12) also moves upwards until the bevelled edge 102 engages the pin 103. The disc 72 still cannot rotate, the pin 81 preventing such rotation. However as the upward movement of the control block 56 continues, the body of the ratchet 62 can now turn, due to the pressure of pin 103 upon the inclined surface 102, between the head of the pin 104 and the control block, so that at the upper extreme position of the control block the position shown in FIGURE 12 is reached. However, the pin 82 now no longer lies in the groove 61, of the control block 56 so that the pin 81 no longer arrests the disc 72. Upon the downward movement of the control block 56, the inclined edge 105 of ratchet 62 engages the pin 103 and the disc 72 is rotated in the direction indicated by the arrow (clockwise), until the pin 103 is clear of the inclined surface 105. At this moment, the pin 82 again enters the groove 61, thus causing the pin 81 to arrest the disc 72. Due to the rotation of the disc 72, a component part has now arrived between the open jaws of the tongs and, due to the continued downward movement of the control block, the jaws are closed and the projections cut to size, whereupon the whole cycle starts again. The tape with the ends bent from the projections still present therein is led in a suitable manner out of the machine.

From the foregoing it is clear that the machine grips the component parts solely at the leads or projections and introduces the leads into the apertures of the mounting plate without deformation. In addition, the body of the component part lies free between the jaws of the tong body. The machine completely obviates the difficulty that the projections have no absolutely defined positions relative to the component body, usually lacquered, and that as a result of the lacquer layer comparatively great tolerances may occur in the projections relative to the body. The machine may operate fully automatically if the component parts and the mounting plate are supplied automatically. It is even possible for the mounting plate to operate a switch which makes the machine operative only when the mounting plate has reached its correct position. On the other hand, the supply of the mounting plates may be co-ordinated with the operation of the machine.

It is not necessary for the component parts supplied to the machine to be secured in a tape. As an alternative, the component parts may be brought between the open jaws in different manners or, if desired, by hand. It is neither necessary for the movements to be brought about by air under pressure. Such is also possible hydraulically, by electrical or mechanical means, for example with the aid of cams.

The machine may insert the component parts into the mounting plate at a considerable speed which in practice is primarily determined by the time required for changing the mounting plates.

If the machine is to be designed for a component part of the same kind other than that for which the machine is adjusted, it is generally necessary only to change the pin 59, since this pin determines the stroke of the pressing rod 27 and this stroke must be only such that the distance between the head 30 and the mounting plate 101 is equal to, but not greater than, the length of the body of the component part.

What is claimed is:

1. A component inserting machine comprising a frame, an operatively connected assembly supported on said frame for inserting components having projecting leads in a printed circuit board; said assembly including gripping means having a pair of relatively movable jaws for gripping the lead wire of a component, feed means for feeding a component into position between said jaws, a first means operatively connected with said gripping means for opening said jaws for receiving a component, means cooperating with said gripping means for cutting the component leads, closure means cooperating with said gripping means for closing and holding said jaws in closed position, a means connected with said gripping means for sequentially moving said jaws through an arcuate path into a plane substantially normal to a printed circuit board and also moving said jaws toward said circuit board within said last mentioned plane, another means connected with said gripping means for moving said component relative to said jaws, and a second means connected with said gripping means for opening said jaws, whereby a component is inserted in said circuit board.

2. A component inserting machine comprising a frame, an operatively connected assembly supported on said frame for inserting components having projecting leads in a printed circuit board; said assembly including gripping means having a pair of relatively movable jaws for gripping the lead wire of a component, feed means for feeding a component into position between said jaws, a first means opening said jaws for receiving a component, means cooperating with said gripping means for cutting said leads, closure means for closing and holding said jaws in closed position, means including a pivotal housing slideably supporting said jaws for sequentially moving said jaws through an arcuate path into a plane substantially normal to a printed circuit board and also moving said jaws toward said circuit board within said last mentioned plane, means for moving said component relative to said jaws, and a second means for opening said jaws, whereby a component is inserted in said circuit board.

3. A machine according to claim 2, wherein said means for gripping components comprises a tong body terminating in a fixed jaw and a relatively movably jaw having an arm in spaced relation with said tong body, said tong body supporting said movable jaw, said space between said tong body and said arm being large enough to accommodate the body portion of a component held by said jaws in engagement with the component leads.

4. A machine according to claim 3, wherein said first means for opening said jaws comprises a stop member positioned on said frame at the end of said arcuate path adjacent said feeding means, and a bearing secured on said movable jaw arm and positioned between said arm and said tong body, and a movable pressing pin engaging said bearing whereby said pin upon engagement with said stop and said bearing separates said fixed and movable jaws.

5. A machine according to claim 4, wherein said means cooperating with said gripping means for cutting the component leads comprises a control member, a cutting blade fixed on said frame adjacent said affixed jaw, said control member being movably mounted on said frame for engaging and moving said fixed jaw, said control member thus moving said fixed jaw into engagement with said component leads and subsequently moving said leads into contact with said cutter for severing said leads said movement of said tong body for separating said pressing pin from said stop member whereby said jaws are closed by resilient means for holding said jaws in closed position.

6. A machine according to claim 5, wherein said control member is mounted for reciprocal movement in said assembly and sequentially engages said feeding means for driving the same, said control member engaging said body adjacent said fixed jaw for severing said leads and disengaging said pressing pin while moving in one direction of said reciprocal movement.

7. A machine according to claim 6 wherein said control member engages means on said frame for terminating movement in said one direction of reciprocal movement and said means on said frame being operatively connected with said means for sequentially moving said jaws through said arcuate path and in said last named plane.

8. A machine according to claim 6 wherein said control member moving in its other direction of reciprocal movement operatively engages both said second means for opening said jaws and said means for moving a component relative to said jaws.

9. A machine according to claim 6 wherein said feeding means comprises a rotatable disc supported on said frame adjacent one end of said arcuate path, a plurality of regularly spaced pins on the side of said disc adjacent said jaws at said one end of said arcuate path and normal to said disc, said pins defining a circle coaxial with the circumference of said disc, a ratchet member pivotally carried on said control block having an inclined projection for engaging one of said pins to rotate said disc, a pivotal lever having a roller engaging adjacent pairs of pins for securing said disc against rotation, a cam groove on said control member and a cam follower in said groove connected with said pivotal lever for disengaging said roller and said pins.

10. A machine according to claim 6 wherein said means for moving said jaws through an arcuate path and in said last named plane comprises a rod, means for moving said rod, a first lever pivotally secured to said rod at one end thereof and linking said rod with a second lever pivotally secured to said first lever at the other end thereof, a collar secured on the said tong body and fixedly connected with said second lever which extends in a plane parallel with said tong body whereby movement of said rod rotates the pivotal housing supporting said tong body and moves said tong body relative to said housing.

11. A machine according ot claim 7 wherein said second means for opening said jaws comprises a first angled lever pivotal on said frame and having a pin at one end for engaging said arm, the other end of said first angled lever engaging said control member for pivoting said first angled lever for opening said movable jaw, a roller on said first lever for engaging said housing for rocking said tong body away from said last mentioned plane in said arcuate path; and said means for moving a component relative to said jaws comprises a second lever pivotally secured at the end of said tong body remote from said jaws, said second lever also engaging said control member, a pressing rod axially movable secured in said tong body having one end in contact with said second lever, the other end of said pressing rod extending between said jaws for engaging a component, said second lever actuating said pressing rod to push a component relative to said jaws and into the circuit board between said jaws in the opened position thereof.

12. A machine according to claim 8 wherein said means for reciprocating said control member comprises a first double acting cylinder and piston assembly including switch relays, and said means for moving said rod for rotating said housing comprises a second double acting cylinder and piston assembly including switch relays, said switch relays being selectively and operatively connected with said first and second cylinder and piston assemblies and said control member and first lever for sequentially energizing said cylinder and piston assemblies.

13. An inserting head for an inserting machine comprising a frame member, a housing member pivotally mounted on said frame, a tong body supported by said housing member for axial movement relative thereto, said tong body having a fixed jaw portion and a movable jaw portion normally projecting beyond said housing, resilient means connected with said tong body for closing said jaws, and means connected with said tong body for rotating said housing and axially moving said body relative thereto, said last named means comprising a rod, means for moving said rod, a first lever pivotally secured to said rod at one end and linking said rod with a second lever pivotally secured to said first lever at the other end thereof, a collar secured on said tong body at said projecting end and fixedly connected with said second lever.

14. An inserting head for an inserting machine comprising a frame member, a housing member pivotally supported on said frame, means for pivotally moving said housing member and axially moving a hollow body axially movable within said housing member, said body having a portion terminating in a fixed jaw, a movable arm having an associated jaw pivotally connected with said body, resilient means for biasing said movable arm for normally closing said jaws, a space defined between said tongs in the closed position of said jaws, a pressing rod supported within said hollow body for axial and tilting movement relative thereto, said rod having a component engaging knob portion within said space and a head portion protruding from said body at the end thereof remote from said jaws, and a pivotal lever having one end engaging said head portion secured on said body at said end remote from said jaws; and means including a control member supported on said frame for reciprocal movement and sequentially engaging said means pivotally moving said housing member and moving said body relative to said housing member; engaging means for opening said jaws at the end of said movement, and engaging means for moving said pressing rod relative to said body for ejecting components from said inserting head.

15. Apparatus for inserting components into a printed circuit board comprising a frame member supporting an assembly, said assembly comprising a pivotally mounted housing member, a hollow body movably supported in said housing, said body having a portion defining a fixed jaw, a movable jaw pivotally mounted on said body, resilient means on said body for normally biasing said movable jaw to closed position, a pressing rod movable within said hollow body having one end adjacent said jaws, a first stop member in said assembly for holding said jaws open for receiving a component, means for feeding a component between said open jaws, and means including a control member reciprocally movable in said assembly, said control member in one direction of movement sequentially driving said feeding means to place a component between said jaws, engaging said fixed jaw for rotating said housing and moving said jaws away from said first stop member and cutter means in said assembly adjacent said feeding means and operatively associated with said jaws for severing said leads upon movement of said jaw away from said first stop member; means operatively connected with said control member at the end of said one direction of movement for rotating said housing member through a length of arc into a position substantially normal to a printed circuit board and moving said body relative to said housing for extending said jaws toward said circuit board, and means including said control member operating in its other direction of movement for sequentially opening said jaws and operating said pressing rod to force said component into engagement with said circuit board.

References Cited by the Examiner

UNITED STATES PATENTS

| 1,762,235 | 6/30 | Metcalf et al. | |
| 2,748,388 | 6/56 | Cardani | 1—323 |
| 2,756,485 | 7/56 | Abramson et al. | 29—155.5 |
| 2,829,371 | 4/58 | Sittner et al. | 1—321 X |
| 2,869,129 | 1/59 | Rodgers | 1—323 |
| 3,079,672 | 3/63 | Bain et al. | 29—155.5 |

FOREIGN PATENTS 693,007   6/53   Great Britain.

GRANVILLE Y. CUSTER, Jr., *Primary Examiner.*

WHITMORE A. WILTZ, *Examiner.*